United States Patent [19]

Reichel et al.

[11] 4,057,038
[45] Nov. 8, 1977

[54] AUXILIARY COMBUSTION CHAMBER FOR A STRATIFIED CHARGE INTERNAL COMBUSTION ENGINE

[75] Inventors: Kurt Reichel, Wolfsburg; Gerd Decker, Vorsfelde; Hans-Alfred Kuck, Isenbüttel; Walter Brandstetter, Gifhorn, all of Germany

[73] Assignee: Volkswagenwerk Aktiengesellschaft, Germany

[21] Appl. No.: 681,817

[22] Filed: Apr. 30, 1976

[30] Foreign Application Priority Data

May 22, 1975 Germany .............................. 2522585

[51] Int. Cl.$^2$ ........................ F02B 19/10; F02B 19/16
[52] U.S. Cl. .................... 123/32 SP; 123/191 SP; 123/32 J; 123/32 AA; 123/32 AH; 123/122 AB
[58] Field of Search .......... 123/191 S, 191 SP, 32 SP, 123/32 C, 32 D, 32 J, 32 K, 32 AA, 32 AH, 122 AB

[56] References Cited

U.S. PATENT DOCUMENTS

| B 425,588 | 1/1976 | Turkish | 123/32 ST |
| 2,003,311 | 6/1935 | Ricardo | 123/32 C |
| 2,089,577 | 8/1937 | Sanders | 123/32 C |
| 2,735,412 | 2/1956 | Kuepfer | 123/32 C |
| 3,989,014 | 11/1976 | Brandstetter | 123/32 C |

Primary Examiner—Ronald B. Cox
Attorney, Agent, or Firm—Brumbaugh, Graves, Donohue & Raymond

[57] ABSTRACT

An auxiliary combustion chamber for a stratified chage internal combustion engine is formed by an insert secured in a bore of the cylinder head. The insert is in the form of a tubular shell having openings for ignition means, fuel supply means, and having a passage communicating with the main combustion chamber. The tubular shell has a relatively massive construction in the region of the passage and is relatively thin walled in the remaining regions to provide the capability for fast warm-up of the auxiliary combustion chamber and to prevent overheating of the chamber in the region of the passage.

3 Claims, 2 Drawing Figures

AUXILIARY COMBUSTION CHAMBER FOR A STRATIFIED CHARGE INTERNAL COMBUSTION ENGINE

BACKGROUND OF THE INVENTION

This invention relates to stratified charge internal combustion engines and particularly to such engines wherein an auxiliary combustion chamber is formed by an insert within the cylinder head.

One prior art auxiliary combustion chamber for an internal combustion engine is shown in published German patent application No. 2,327,703. The auxiliary chamber disclosed in that application is formed using an insert which is placed within the cylinder head from outside of the main combustion chamber. The auxiliary combustion chamber is retained within the cylinder head together with an auxiliary fuel inlet valve which controls the supply of a rich fuel mixture to the auxiliary chamber. The auxiliary chamber has an opening at the end opposite the valve which communicates with a passage through the cylinder head to the main combustion chamber. The auxiliary chamber is secured within a recess in the cylinder head in such a way as to provide a clearance between the interior wall of the cylinder head recess and the outside of the insert forming the combustion chamber. This clearance provides a measure of heat insulation for the auxiliary combustion chamber, thereby enabling the auxiliary combustion chamber to rapidly warm-up. After the auxiliary combustion chamber has reached its normal, elevated operating temperature, the expansion of the insert which forms the auxiliary chamber brings the chamber into close fitting contact with the interior wall of the recess in the cylinder head, thereby enabling more effective transfer of heat from the auxiliary combustion chamber to the surrounding cylinder head.

One problem with prior art auxiliary combustion chambers as described in the published German application is that insertion of the auxiliary combustion chamber from the outside of the cylinder head requires rather complex structural arrangements to maintain the auxiliary combustion chamber within the cylinder head recess. This retaining structure is complicated by the fact that there must be included the auxiliary inlet valve in conjunction with the retaining structure. Another problem with such prior art auxiliary combustion chamber construction is that in the arrangement shown it is possible, prior to full expansion of the insert, that combustion residues, such as carbon, that are formed during engine warm-up, may become embedded between the auxiliary combustion chamber insert and the interior wall of the cylinder head. In this event it will not be possible for the auxiliary combustion chamber insert to come into effective thermal conducting contact with the interior wall of the cylinder head recess. Another problem with the previously disclosed construction is that, because the auxiliary combustion chamber insert is inserted into the cylinder head recess from the side away from the main combustion chamber, and the seat provided for the auxiliary combustion chamber is located toward the outside of the main combustion chamber, the auxiliary combustion chamber, even absent carbon deposits does not come into effective heat transmitting contact with the cylinder head in the region of the passage to the main combustion chamber. This region is the location at which maximum heat-up of the auxiliary combustion chamber is normally encountered. Such excessive heat build-up at the passage between the auxiliary combustion chamber and the main combustion chamber may result in excess temperatures and consequent spontaneous ignitions thereby causing poor engine operation.

A prior U.S. patent application Ser. No. 632,699 filed Nov. 17, 1975, which is assigned to the same assignee as the present invention, discloses an auxiliary combustion chamber formed by a cup-shaped insert comprising a thin walled generally tubular shell for use in a stratified charge internal combustion engine wherein fuel is delivered to the auxiliary combustion chamber by a fuel injecting device. The insert in this prior application is formed of relatively thin metal in all regions and the side wall of the insert includes a plurality of regions spacedly arranged from one another and force-fittedly applied against the inner wall of the cavity, one of the regions being located adjacent the bottom of the insert. However, since the walls of the insert in all regions are relatively thin, heat dissipation through the walls of the insert is limited. Therefore it is desirable to provide additional heat dissipation especially in the region of the passage between the auxiliary combustion chamber and the main combustion chamber.

OBJECT OF THE PRESENT INVENTION

It is therefore an object of the present invention to provide an auxiliary combustion chamber for an internal combustion chamber which provides for rapid auxiliary combustion chamber warm-up, but effective heating conductive cooling of the combustion chamber.

It is a further object of the present invention to provide such an auxiliary combustion chamber which may simply and easily be inserted into the cylinder head of an internal combustion engine.

SUMMARY OF THE INVENTION

In accordance with the present invention there is provided an auxiliary combustion chamber for use in a stratified charge internal combustion engine having at least one main combustion chamber enclosed by a cylinder and a cylinder head. The auxiliary combustion chamber comprises an insert secured in a bore on the cylinder head open toward the main combustion chamber. The insert is in the form of a tubular shell with openings for ignition means and fuel supply means. The shell also has a passage for communicating with the main combustion chamber. The shell has a relatively massive construction in a section near the passage and is relatively thin walled in the remaining section.

In accordance with further embodiments of the invention the combustion chamber insert is secured within the bore in the cylinder head by the mating of the cylinder head to the cylinder. The insert is preferably mounted within the cylinder head adjacent to the exhaust passage and in contact with the internal wall of the bore in the circumferential region adjacent to the exhaust passage and with a clearance from the internal wall of the bore in other circumferential regions. The circumferential variation of the spacing between the insert and the bore may be achieved by making either the insert or the bore of eccentric cross section. The insert is preferably in close contact with the bore in all circumferential directions in the massive section surrounding the passage.

For a better understanding of the present invention, together with other and further objects, reference is had to the following description taken in conjunction with the accompanying drawings, and its scope will be pointed out in the appended claims.

DESCRIPTION OF THE INVENTION

Figure 1:
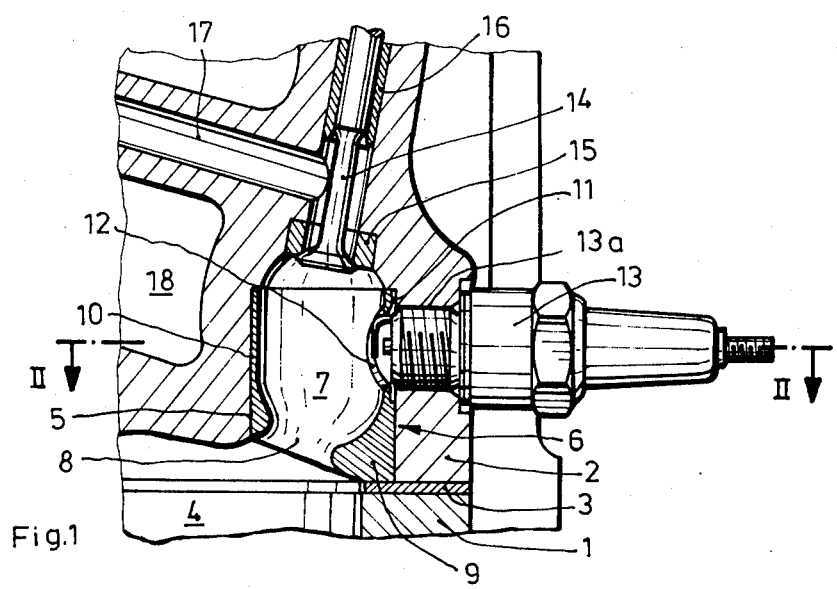
FIG. 1 is a partial radial cross sectional view of a cylinder, cylinder head and auxiliary combustion chamber in accordance with the present invention.
Figure 2:
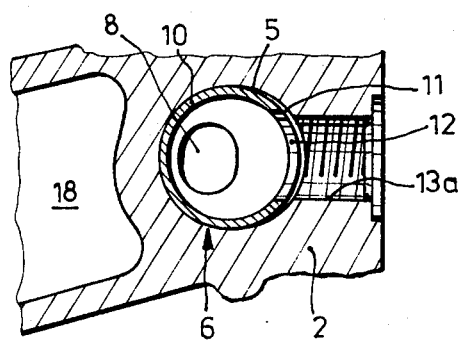
FIG. 2 is an axial cross-sectional view illustrating details of the auxiliary combustion chamber of FIG. 1.

FIG. 1 shows a partial cross section in an axial plane of a cylinder, in the region of an auxiliary combustion chamber. Shown in FIG. 1 is a partial wall of a cylinder 1 which is connected to a cylinder head 2. A head gasket 3 is provided for sealing the enclosure formed by the cylinder and cylinder head, which forms main combustion chamber 4. Combustion chamber 4 is closed on one side by a piston, which is not shown in the drawing. Cylinder head 2 has a bore 6 formed in the cylinder head from the side adjacent to the main combustion chamber. Within bore 6 there is provided an insert 5 which forms auxiliary combustion chamber 7. Insert 5 comprises a tubular shell and is provided with a passage 8 connecting main combustion chamber 4 with auxiliary combustion chamber 7. Passage 8 is illustrated with circular cross section, but may also have non-circular cross-section or comprise multiple passages. There is additionally provided an opening 12 in the side of insert 5 through which may be inserted an ignition device such as spark plug 13 threaded into tapped hole 13a of the cylinder head and protruding into auxiliary combustion chamber 7. Combustion chamber 7 is also open at the stop at which there is located auxiliary inlet valve 14 with guide 16 and cooperating with seat 15. Auxiliary inlet valve 14 is provided to permit flow of a fuel rich mixture through inlet passage 17 into auxiliary combustion chamber 7.

Insert 5 is provided in the region of passage 8 with a section 9 having relatively massive construction thereby providing for effective heat absorption in the region surrounding passage 8. In this section insert 5 is also in close circumferential contact with bore 6. The upper section of insert 5, adjacent to fuel inlet valve 14 is of relatively thin wall construction. In addition this section of insert 5 is eccentric in shape and mounted within bore 6 in close fitting contact in the circumferential region 10, which is adjacent to exhaust passage 18 in the cylinder head. In the remaining circumferential regions of the thin wall section of insert 5 there is provided a gap 11 between cylinder head 2 and insert 5.

By providing a thin wall construction in the upper section of insert 5, adjacent to fuel inlet valve 14, and providing close proximity to exhaust passage 18 in the circumferential region 10, and a spacing 11 in the remaining circumferential regions in this section of insert 5, auxiliary combustion chamber 7 is enabled to reach operating temperature very rapidly after the engine is started. Proximity in the region 10 to exhaust passage 18 permits excess heat from exhaust gases to be conducted to the auxiliary combustion chamber. Spacing 11 in the circumferential regions of insert 5 away from exhaust passage 18 provides insulation between the walls of insert 5 and the surrounding cylinder head. This construction therefore facilitates rapid warm-up of the section of auxiliary combustion chamber 7 adjacent to inlet 14 thereby assuring effective vaporization of fuel in this region a short time after the engine is started and assuring effective combustion of the fuel-air mixture, thereby resulting in low emission of unburned fuel components. While it is desirable that there be a rapid warm-up of the section of combustion chamber 7 adjacent to inlet 14, it is desirable to provide effective heat transfer in the section of combustion chamber 7 adjacent passage 8. For this reason the lower section of insert 5 is formed with relatively massive construction 9 and is closely fitted to bore 6 in all circumferential directions, thereby assuring efficient heat transfer from this section of insert 5 to cylinder head 2.

Insert 5 is effectively maintained in bore 6 by heat shrinking the insert into the bore and is additionally maintained with the bore by the fact that the wall of cylinder 1 overlaps bore 6, thereby preventing removal of insert 5 from bore 6.

In additional to the beneficial thermal properties of the insert in accordance with the present invention, the insert construction and installation is separate and independent of the construction and installation of the auxiliary inlet valve 14 and its associated passages and guide rods. The independent construction of the auxiliary combustion chamber therefore simplifies the design of the cylinder head.

While there have been described what are believed to be the preferred embodiments of the present invention, those skilled in the art will recognize that other and further modifications may be had thereto without departing from the true spirit and scope of the invention, and it is intended to cover all such embodiments which fall within the true scope of the invention.

We claim:

1. An auxiliary combustion chamber, usable in a stratified charge internal combustion engine having at least one main combustion chamber enclosed by a cylinder and a cylinder head and an exhaust passage in said cylinder head, comprising an insert secured in a bore on said cylinder head, said bore being adjacent to said exhaust passage, said insert comprising a tubular shell, having openings for ignition means and fuel supply means and having a passage communicating with said main combustion chamber, said shell having a relatively thin walled section which is in close contact with the interior wall of said bore in a circumferential region adjacent to said exhaust passage and which has a clearance from the interior wall of said bore in the remaining circumferential regions.

2. A combustion chamber in accordance with claim 1 wherein said shell has an eccentric cross section in said this wall section.

3. A combustion chamber in accordance with claim 1 wherein said bore has an eccentric cross section adjacent to said thin wall section of said insert.

* * * * *